US007465606B2

(12) United States Patent
DeWys et al.

(10) Patent No.: US 7,465,606 B2
(45) Date of Patent: Dec. 16, 2008

(54) RESISTANCE WELDED SOLDER CRIMP FOR JOINING STRANDED WIRE TO A COPPER LEAD-FRAME

(75) Inventors: John William DeWys, London (CA); Sergey Tyshchuk, London (CA); Johannes Brouwers, Port Stanley (CA); Murray Van Duynhoven, St. Thomas (CA); John Edward Makaran, London (CA)

(73) Assignee: Brose Fahrzeugteile GmbH & Co. Kommanditgesellschaft, Wurzburg, Wurzburg (DE)

( * ) Notice: Subject to any disclaimer, the term of this patent is extended or adjusted under 35 U.S.C. 154(b) by 232 days.

(21) Appl. No.: 11/541,602

(22) Filed: Oct. 3, 2006

(65) Prior Publication Data
US 2007/0077684 A1   Apr. 5, 2007

Related U.S. Application Data

(60) Provisional application No. 60/723,313, filed on Oct. 4, 2005.

(51) Int. Cl.
*H01L 21/44* (2006.01)
(52) U.S. Cl. .................. 438/106; 438/108; 438/111; 438/116; 257/E21.121; 257/E21.131; 257/E21.141
(58) Field of Classification Search ......... 438/106–116; 257/E21.131, E21.121, E21.141
See application file for complete search history.

(56) References Cited

U.S. PATENT DOCUMENTS

| 4,779,335 | A | * | 10/1988 | Schwartzman et al. | ......... 29/751 |
| 5,465,016 | A | * | 11/1995 | Mancl et al. | .................. 310/71 |
| 5,774,976 | A | * | 7/1998 | Stark | ........................... 29/732 |
| 6,519,832 | B1 | * | 2/2003 | DeHart | ....................... 29/596 |
| 2006/0261691 | A1 | * | 11/2006 | Minke et al. | .................. 310/71 |
| 2007/0074385 | A1 | * | 4/2007 | Ikegaya et al. | ................ 29/600 |

* cited by examiner

*Primary Examiner*—Michael S Lebentritt
(74) *Attorney, Agent, or Firm*—Manelli Denison & Selter PLLC; Edward J. Stemberger

(57) ABSTRACT

A method of connecting stranded wire to a lead-frame body 10 includes the provision of a stranded wire 12. It is ensured that insulation is stripped from an end 14 of the stranded wire. An electrically conductive lead-frame connection structure 16 is associated with the lead-frame body. The end 14 of the stranded wire is inserted into the lead-frame connection structure 16 so that the lead-frame connection structure substantially surrounds the wire end. Solder flux is injected so as to be substantially about a portion of the end of the stranded wire. The lead-frame connection structure is placed in contact with a bottom resistance welding electrode 18 or a top resistance welding electrode 20. The electrode that is not presently in contact with the lead-frame connection structure is moved so as to contact the lead-frame connection structure to resistance weld the wire end 14 to the lead-frame connection structure 16 and thereby define a solder crimp connection 22 of the wire end and the lead-frame connection structure.

20 Claims, 6 Drawing Sheets

| | Soldering | Crimp | Resistance Welding | Ultrasonic Welding |
|---|---|---|---|---|
| Mechanical Properties | | | | |
| Pulloff Force | 9 | 9 | 10 | 10 |
| Low Creep | 9 | 9 | 10 | 10 |
| Strength | 9 | 9 | 7 | 10 |
| Applicability for join of tin plated copper buss to stranded copper wire | 9 | 10 | 0 (Materials are of the same material, ring around the wire required, 4 with ring) | 7 |
| Electrical Properties | | | | |
| Low Resistance | 9 | 9 | 10 | 10 |
| Resistance Stability | 10 | 9 | 10 | 10 |
| Low Voltage Drop | 9 | 9 | 10 | 10 |
| High Current | 8 | 9 | 9 | 10 |
| Environmental Properties | | | | |
| High Temperature | 5 | 9 | 9 | 9 |
| Low Temperature | 9 | 9 | 9 | 9 |
| Thermal Shock | 8 | 8 | 9 | 9 |
| Vibration | 6 | 9 | 9 | 9 |
| Aging | 9 | 9 | 10 | 10 |
| Hermetic | 9 | 8 | 5 | 9 |
| Manufacturing Properties | | | | |
| Method requires little space | 8 | 9 | 6 | 8 |
| Repair Ease | 9 | 7 | 6 | 6 |
| Cost | | | | |
| Tooling | Soldering Equipment, Fume extraction equipment, ESD | Controller and wire support fixture, crimp tooling and press, ESD | Controller and wire support fixture, press, ESD | Controller and wire support fixture, press, ESD |
| Tooling maintenance | ~$10 Soldering tip replacement, | | | ~$3000 to 5000 per head, replacement of heads every 100,000 shots |
| Process/Labour | only one connection can be made at once | multiple connections can be made at the same time | only one connection can be made at once | only one connection can be made at once |
| Connector/Material | Solder | none, crimp built into the copper buss on the controller | CMW 28 or Elkon 100M electrode required | None |

Table 1: Comparison Of Most Commonly Used Connection Methods (10= best)

FIG. 1
(Prior Art)

| Sample Numder | Connection Number | Wire Guage | Measued Voltage (mV) | Set Current (Amps) | Calculated Contact Resistance (uOhms) | Measured Contact Resistance (uOhms) |
|---|---|---|---|---|---|---|
| 1 | 1 | 20 AWG | 0.9 | 10.0 | 90.0 | 97.0 |
| | 2 | 20 AWG | 1.1 | 10.0 | 110.0 | 84.0 |
| | 3 | 10 AWG | 0.1 | 10.0 | 10.0 | 39.0 |
| | 4 | 10 AWG | 0.2 | 10.0 | 20.0 | 26.0 |
| | 5 | 10 AWG | 0.1 | 10.0 | 10.0 | 38.0 |
| | 6 | 10 AWG | 0.1 | 10.0 | 10.0 | 25.0 |
| 2 | 1 | 20 AWG | 1.8 | 20.0 | 90.0 | 97.0 |
| | 2 | 20 AWG | 2.2 | 20.0 | 110.0 | 84.0 |
| | 3 | 10 AWG | 0.3 | 20.0 | 15.0 | 39.0 |
| | 4 | 10 AWG | 0.3 | 20.0 | 15.0 | 26.0 |
| | 5 | 10 AWG | 0.3 | 20.0 | 15.0 | 38.0 |
| | 6 | 10 AWG | 0.3 | 20.0 | 15.0 | 25.0 |
| 3 | 1 | 20 AWG | 3 | 30.0 | 100.0 | 97.0 |
| | 2 | 20 AWG | 3.3 | 30.0 | 110.0 | 84.0 |
| | 3 | 10 AWG | 0.4 | 30.0 | 13.3 | 39.0 |
| | 4 | 10 AWG | 0.5 | 30.0 | 16.7 | 26.0 |
| | 5 | 10 AWG | 0.4 | 30.0 | 13.3 | 38.0 |
| | 6 | 10 AWG | 0.4 | 30.0 | 13.3 | 25.0 |
| 4 | 1 | 20 AWG | 3.9 | 40.0 | 97.5 | 97.0 |
| | 2 | 20 AWG | 4.5 | 40.0 | 112.5 | 84.0 |
| | 3 | 10 AWG | 0.6 | 40.0 | 15.0 | 39.0 |
| | 4 | 10 AWG | 0.7 | 40.0 | 17.5 | 26.0 |
| | 5 | 10 AWG | 0.5 | 40.0 | 12.5 | 38.0 |
| | 6 | 10 AWG | 0.5 | 40.0 | 12.5 | 25.0 |

Table 2

FIG. 6

RESISTANCE WELDED SOLDER CRIMP FOR JOINING STRANDED WIRE TO A COPPER LEAD-FRAME

This application claims the benefit of the earlier filing date of U.S. Provisional Application No. 60/723,313, filed on Oct. 4, 2005, which is incorporated by reference herein in its entirety.

FIELD OF THE INVENTION

This invention relates to, but is not limited to, the interconnection of an electronic controller to a permanent magnet (PM) direct current (DC) motor or Engine Control Module (ECM) for automotive applications.

BACKGROUND OF THE INVENTION

An electronic controller used to control the speed of the permanent magnet DC motor needs some type of connection structure to connect the ECM and the permanent magnet DC motor to the electronic controller. The most commonly used connection methods are soldering, crimping, resistance welding, and ultra sonic welding. A rated comparison of these methods is shown in Table 1 (FIG. 1).

There is a need for a low electrical resistance, low cost, reliable with high mechanical stress resistance connection method that is hermetically sealed from the environment. This method must also allow for the separate manufacturing and transport of the components without the need of connectors.

SUMMARY OF THE INVENTION

An object of the invention is to fulfill the need referred to above. In accordance with the principles of the present invention, this objective is achieved by a method of connecting stranded wire to a lead-frame body. The method provides a stranded wire. It is ensured that insulation is stripped from an end of the stranded wire and that stripped end of the stranded wire is tinned with solder. An electrically conductive lead-frame connection structure is associated with the lead-frame body. The end of the stranded wire is inserted into the lead-frame connection structure so that the lead-frame connection structure substantially surrounds the wire end. Solder flux is injected so as to be substantially about a portion of the end of the stranded wire. The lead-frame connection structure is placed in contact with a bottom resistance welding electrode or a top resistance welding electrode. The electrode that is not presently in contact with the lead-frame connection structure is moved so as to contact the lead-frame connection structure to resistance weld the wire end to the lead-frame connection structure and thereby define a solder crimp connection of the wire end and the lead-frame connection structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, in which:

FIG. 1 shows Table 1, a comparison of conventional wire and lead-frame connection methods.

FIG. 6 shows Table 2, contact resistance of various sized wires in accordance with an embodiment of the invention.

DETAILED DESCRIPTION OF EXEMPLARY EMBODIMENTS

Figure 2:
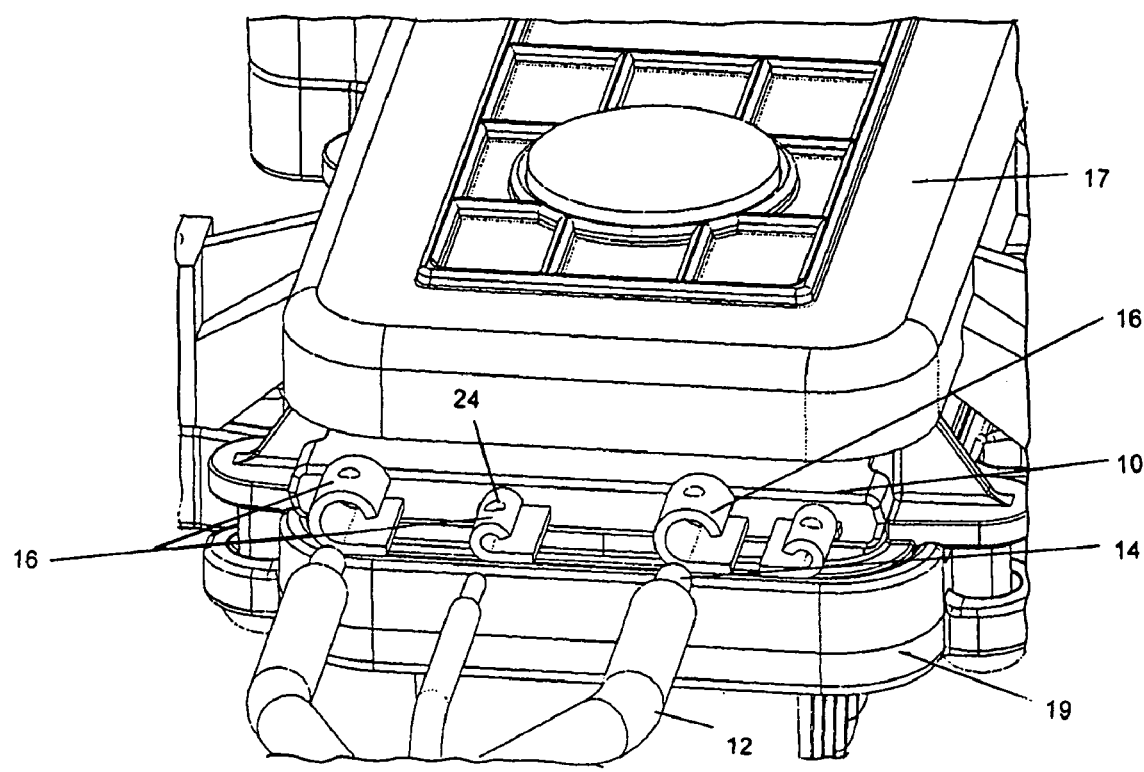
FIG. 2 illustrates wire ends being inserted into lead-frame connection structures in accordance with an embodiment of the invention.

With reference to FIG. 2, an electrical connection between a lead-frame body 10 and a portion of an insulated stranded wire 12 is shown in accordance with the principles of an embodiment of the present invention. The body 10 is preferably of copper and part of a controller or ECM having a cover 17 and a heatsink 19. The wires 12 are preferably from a PMDC motor (not shown) for connection to the lead-frame body 10 of the controller for automotive applications.

Each insulated stranded wire 12 is prepared by striping about 5 to 7 mm of insulation from the end thereof, defining a stripped end 14. Each stripped stranded wire end is then tinned with solder. The solder has two purposes. Firstly, it keeps the stranded wire of the stripped end 14 together for ease during insertion into a lead-frame connection structure 16. Secondly, the solder flows during a resistance welding process to provide a low contact resistance, high mechanical stress resistive, hermetic joint as will be explained further below.

Figure 3:
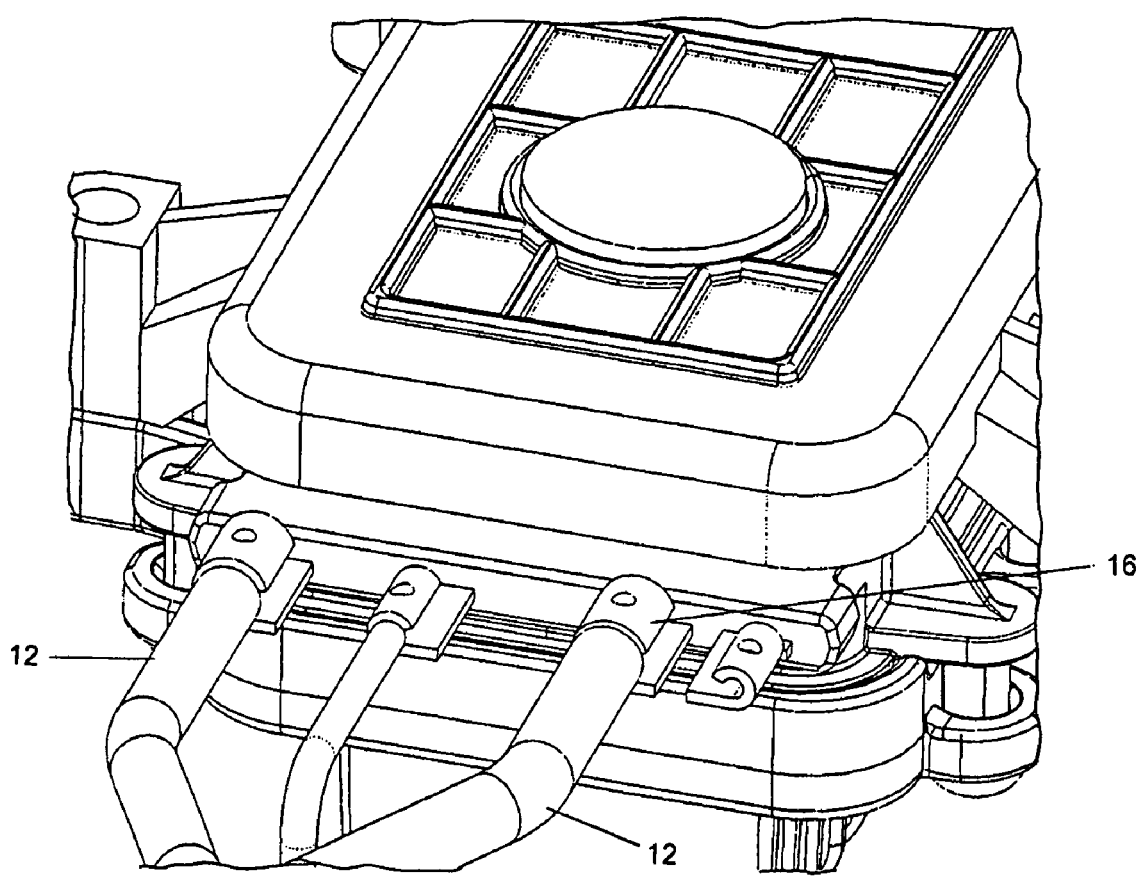
FIG. 3 illustrates the wire ends of FIG. 2 inserted into the lead-frame connection structures.

The lead-frame connection structure 16 is electrically conductive (e.g., copper) and is preferably part of the lead-frame body 10. With reference to FIG. 3, the stripped and solder tinned wire end 14 (not seen in FIG. 3) is inserted into associated generally C-shaped lead-frame connection structures 16. Thus, the connection structures 16 substantially surround the wire end 14.

Figure 4D:
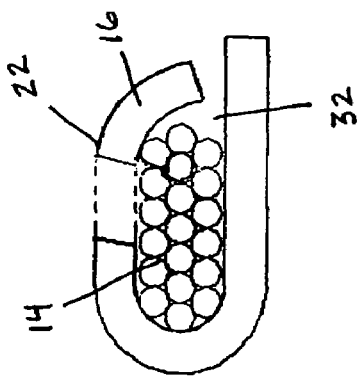
FIGS. 4a-4d show various stages of the solder crimping process of an embodiment of the invention.
Figure 4C:
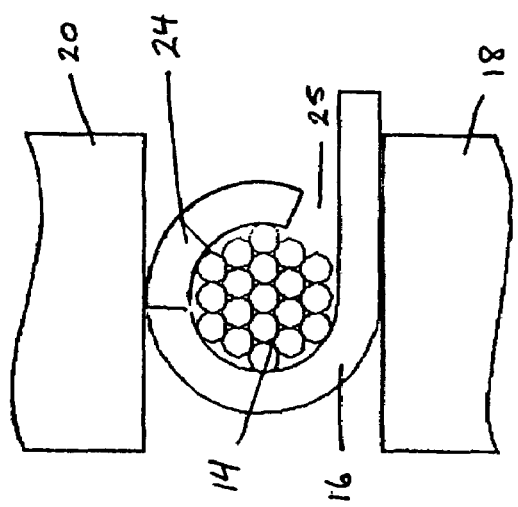
Figure 4B:
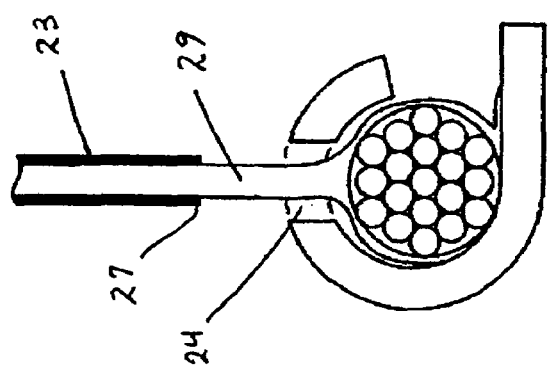
Figure 4A:
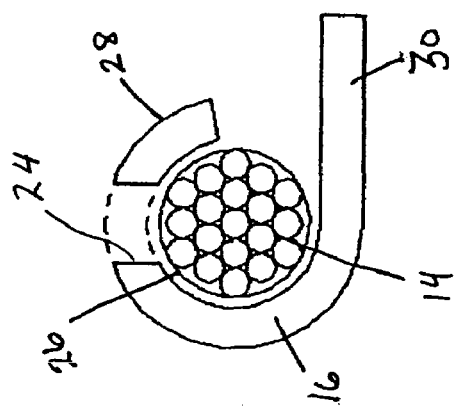

As shown in FIGS. 4a and 4b, surfaces defining holes 24 may be provided through the top wall of the lead-frame connection structure 16 to allow for injection of solder flux into the crimp area (and substantially about the wire end 14) to help with the reflow of the tinned solder on the wire end 14. The injection of solder flux is preferred, not required. Thus, as shown in FIG. 4b, a flux dispenser includes a needle 23 having an end 27 that dispenses flux 29. The needle end 27 can be blunt (as shown), chamfered or tapered. The needle 23 can be tubing made by tightly rolling sheet metal to form a butt joint that is then seam welded. Alternatively, the needle 23 can be machined from a single block of stainless steel with very tight tolerances. With a twenty gauge blunt end needle 23, in order to supply the flux 29 in a stream, a pump speed of 960 rpm is used. The height of the needle (from the top of the connection structure 16 to the needle end 27) is preferably about 1.5 mm.

The flux 29 is preferably provided in shots with an interval between shots of about one second. In order to obtain repeatable dispensing flux volume, the presence of air bubbles can be monitored by a bubble detector (not shown). It has been found that air bubbles of less than 1 mm in diameter have little effect on the dispensing volume, and are thus acceptable. If an air bubble of more than 1 mm in diameter is detected in the flux, a flux purge is employed.

The fluxing process provides a consistent re-flow of the solder during the resistance welding process described below. The fluxing process is used to reduce or eliminate oxidation from the surface of the solder, reduce the melting point of the soldering during the resistance welding process during heating, and improve the fluidity of surface of the solder.

With reference to FIG. 4c, the lead-frame connection structure 16 is held in place over a bottom resistance welding electrode 18 while a top resistance welding electrode 20 moves down onto the top of the lead-frame connection structure 16 to complete the resistance weld and thereby define a solder crimp connection 22 (FIG. 4d). In production, a fixture may be needed to keep the lead-frame connection structure 16 in position over the bottom resistance welding electrode 18. The insulated stranded wire 12 may also require a fixture to hold the stripped and solder tinned wire end 14 in the correct position in the crimping area of the lead-frame connection structure 16 during the resistance welding process. It can be appreciated that the bottom electrode 18 may be the movable electrode if desired.

FIGS. 4a-4d show how the stripped and solder tinned wire ends 14 position themselves during each step of the resistance welding process. As shown in FIG. 4a, a tolerance space 26 is provided between the lead-frame connection structure 16 and the stripped and solder tinned wire end 14. This tolerance space has two purposes. Firstly, it allows for easy insertion of the stripped and solder tinned wire end 14 into the crimp area 32 (FIG. 4d). Secondly, with reference to FIG. 4c, as pressure is applied from the resistance welding electrode 20 to the top of the lead-frame connection structure 16, the tolerance space allows a gap 25 to reduce between a tip 28 and a base 30 of the lead-frame connection structure 16 to capture the strands of wire end 14 in a crimp area 32 before the resistance welded solder crimp connection 22 is formed. FIG. 4d shows the final position of the strands of wire end 14 in the crimp area 32 after the resistance welded solder crimp connection 22 is formed. A cross-sectional cut of the finished weld during prototype trials of the process revealed that the predicted positions of the strands of wire end 14 were accurate, being similar to FIG. 4d.

The flux (FIG. 4b) can be applied to all of the connection structures 16 in sequences and thereafter, fusing (FIG. 4c) of the connection structures can take place in sequence.

A terminal height of the crimp welded connection 22 can be monitored for quality assurance. The terminal height is defined as the after fusing crimp height at the center of the flux hole 24. Under the same force, the terminal height decreases as heat increase. Thus, sine there is a direct relationship between the height and the fusing quality, the terminal is monitored. Any part with a terminal height outside a normal range is rejected.

Figure 5:
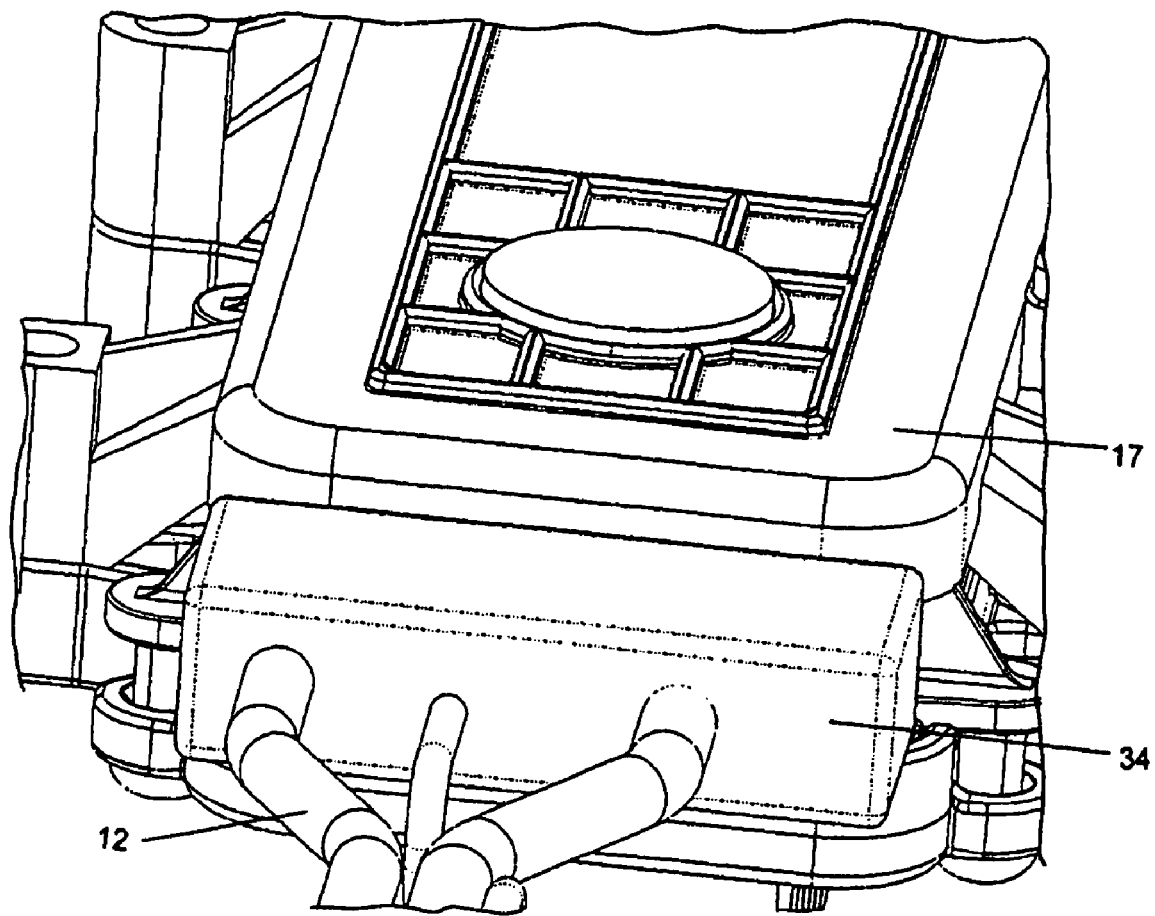
FIG. 5 illustrates an over-molded hermitic seal to seal the welded connection of an embodiment of the invention.

A particular embodiment of the invention shown in FIG. 5 includes over-molding plastic or using a potting material 34 to hermetically seal the finished welded connections 22.

The embodiments provide at least the following advantages:

1) The resistance welded solder crimp connection 22 provides a connection with a low contact resistance (See Table 2, FIG. 6).
2) The resistance welded solder crimp connection 22 provides a connection with a high mechanical stress resistance. Pull tests results show 10 AWG wire connection can withstand forces of 260 to 270 lbf and 20 AWG wire can withstand forces of 70 to 120 lbf.
3) Reflow of the solder used to tin the wires provides a good hermetically sealed connection 22.
4) The profile configuration of the crimping area 32 of the lead-frame connection structure 16 provides a method to capture the wire strands in the crimp area before the resistance welded solder crimp is formed.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of connecting stranded wire to a lead-frame body, the method including the steps of:
   providing a stranded wire,
   ensuring that insulation is stripped from an end of the stranded wire and ensuring that stripped end of the stranded wire is tinned with solder,
   providing an electrically conductive lead-frame connection structure associated with the lead-frame body,
   inserting the end of the stranded wire into the lead-frame connection structure so that the lead-frame connection structure substantially surrounds the wire end,
   injecting solder flux so as to be substantially about a portion of the end of the stranded wire,
   placing the lead-frame connection structure in contact with a bottom resistance welding electrode or a top resistance welding electrode, and
   moving the electrode that is not presently in contact with the lead-frame connection structure so as to contact the lead-frame connection structure to resistance weld the wire end to the lead-frame connection structure and thereby define a solder crimp connection of the wire end and the lead-frame connection structure.

2. The method of claim 1, wherein the connection structure includes surfaces defining a hole through a wall thereof and the step of injecting solder flux includes injecting the flux in a stream at certain time intervals through the hole.

3. The method of claim 1, further including molding plastic material over the crimp connection to hermetically seal the crimp connection.

4. The method of claim 1, further including potting the crimp connection to hermetically seal the crimp connection.

5. The method of claim 1, wherein the lead-frame connection structure is in contact with a bottom resistance welding electrode and the top resistance welding electrode is moved.

6. The method of claim 1, wherein the step of providing a lead-frame connection structure includes providing the connection structure of generally C-shape, having a tip and a base, with a gap between the tip and base.

7. The method of claim 6, wherein the inserting step includes ensuring that a space is provided between the end of the stranded wire and lead-frame connection structure.

8. The method of claim 7, wherein during the moving step, the space permits the gap to reduce, thereby capturing the end of the stranded wire.

9. The method of claim 1, wherein the step of providing the stranded wire includes providing the stranded wire as wire of a motor.

10. The method of claim 9, wherein the lead-frame connection structure is part of the lead-frame body and the lead-frame body is part of a controller.

11. A solder crimp connection produced by a process including the steps of:

providing a stranded wire, ensuring that insulation is stripped from an end of the stranded wire and ensuring that stripped end of the stranded wire is tinned with solder, providing an electrically conductive lead-frame connection structure associated with the lead-frame, inserting the end of the stranded wire into the lead-frame connection structure so that the lead-frame connection structure substantially surrounds the wire end, injecting solder flux so as to be substantially about a portion of the end of the stranded wire, placing the lead-frame connection structure in contact with a bottom resistance welding electrode or a top resistance welding electrode, and moving the electrode that is not presently in contact with the lead-frame connection structure so as to contact the lead-frame connection structure to resistance weld the wire end to the lead-frame connection structure and thereby define a solder crimp connection of the wire end and the lead-frame connection structure.

12. The connector of claim 11, wherein the connection structure includes surfaces defining a hole through a wall thereof and the step of injecting solder flux includes injecting the flux in a stream at certain time intervals through the hole.

13. The connection of claim 11, further including molding plastic material over the crimp connection to hermetically seal the crimp connection.

14. The connection of claim 11, further including potting the crimp connection to hermetically seal the crimp connection.

15. The connection of claim 11, wherein the lead-frame connection structure is in contact with a bottom resistance welding electrode and the top resistance welding electrode is moved.

16. The connection of claim 11, wherein the step of providing a lead-frame connection structure includes providing the connection structure of generally C-shape, having a tip and a base, with a gap between the tip and base.

17. The connection of claim 16, wherein the inserting step includes ensuring that a space is provided between the end of the stranded wire and lead-frame connection structure.

18. The connection of claim 17, wherein during the moving step, the space permits the gap to reduce, thereby capturing the end of the stranded wire.

19. The connection of claim 11, wherein the step of providing the stranded wire includes providing the stranded wire as wire of a motor.

20. The connection of claim 19, wherein the lead-frame connection structure is part of the lead-frame body and the lead-frame body is part of a controller.

* * * * *